United States Patent
Khan et al.

(10) Patent No.: US 11,118,080 B2
(45) Date of Patent: Sep. 14, 2021

(54) REINFORCEMENT BARRIER COATINGS

(71) Applicant: SUN CHEMICAL CORPORATION, Parsippany, NJ (US)

(72) Inventors: Asad Aslam Khan, Ilford (GB); Michael William Leonard, Tonbridge (GB)

(73) Assignee: Sun Chemical Corporation, Parsippany, NJ (US)

( * ) Notice: Subject to any disclaimer, the term of this patent is extended or adjusted under 35 U.S.C. 154(b) by 189 days.

(21) Appl. No.: 16/323,860

(22) PCT Filed: Aug. 9, 2017

(86) PCT No.: PCT/US2017/046077
§ 371 (c)(1),
(2) Date: Feb. 7, 2019

(87) PCT Pub. No.: WO2018/031640
PCT Pub. Date: Feb. 15, 2018

(65) Prior Publication Data
US 2019/0352530 A1    Nov. 21, 2019

Related U.S. Application Data

(60) Provisional application No. 62/374,052, filed on Aug. 12, 2016, provisional application No. 62/407,105, filed on Oct. 12, 2016.

(51) Int. Cl.
| | | |
|---|---|---|
| *C09D 129/04* | (2006.01) |
| *C09D 7/20* | (2018.01) |
| *C09D 7/40* | (2018.01) |
| *B32B 27/08* | (2006.01) |
| *B32B 27/32* | (2006.01) |
| *B32B 27/36* | (2006.01) |
| *B65D 65/40* | (2006.01) |
| *B65D 65/42* | (2006.01) |
| *C09D 5/00* | (2006.01) |
| *C08J 7/04* | (2020.01) |
| *C08J 7/043* | (2020.01) |
| *C08J 7/048* | (2020.01) |

(52) U.S. Cl.
CPC ............ *C09D 129/04* (2013.01); *B32B 27/08* (2013.01); *B32B 27/32* (2013.01); *B32B 27/36* (2013.01); *B65D 65/40* (2013.01); *B65D 65/42* (2013.01); *C08J 7/043* (2020.01); *C08J 7/048* (2020.01); *C08J 7/0423* (2020.01); *C08J 7/0427* (2020.01); *C09D 5/00* (2013.01); *C09D 7/20* (2018.01); *C09D 7/67* (2018.01); *B32B 2255/26* (2013.01); *B32B 2439/00* (2013.01); *C08J 2323/12* (2013.01); *C08J 2367/02* (2013.01); *C08J 2367/04* (2013.01); *C08J 2375/00* (2013.01); *C08J 2429/04* (2013.01)

(58) Field of Classification Search
CPC .......... C09D 129/04; C09D 7/67; C09D 7/20; B32B 2439/00; B32B 27/08; B32B 27/36; B32B 27/32; B32B 2255/26; C08J 7/047; C08J 7/045; C08J 2367/02; C08J 2367/04; C08J 2323/12; C08J 2375/00; C08J 2429/04; B65D 65/40; B65D 65/42; C08D 5/00
USPC ....................................................... 524/563
See application file for complete search history.

(56) References Cited

U.S. PATENT DOCUMENTS

| | | | |
|---|---|---|---|
| 5,349,023 A | 9/1994 | Ikeda et al. | |
| 6,656,602 B1 | 12/2003 | Ishikawa et al. | |
| 7,288,313 B2 | 10/2007 | Sasaki et al. | |
| 8,080,297 B2 | 12/2011 | Kravitz et al. | |
| 2003/0187113 A1 | 10/2003 | Shiho et al. | |
| 2004/0115445 A1* | 6/2004 | Sasaki ............... | C23C 16/30 428/451 |
| 2006/0116471 A1* | 6/2006 | Aoyama ............ | C08F 226/02 525/60 |
| 2009/0269592 A1 | 10/2009 | Hakamata et al. | |
| 2010/0255326 A1* | 10/2010 | Chiappini .......... | C08L 39/00 428/474.4 |
| 2011/0076511 A1 | 3/2011 | Paolilli | |
| 2013/0302630 A1 | 11/2013 | Ono | |
| 2014/0141262 A1 | 5/2014 | Castle et al. | |
| 2016/0009942 A1 | 1/2016 | Horiike et al. | |
| 2016/0053133 A1* | 2/2016 | Beall ................. | C09D 133/02 426/89 |

FOREIGN PATENT DOCUMENTS

| | | |
|---|---|---|
| JP | 2001145973 A | 5/2001 |
| JP | 2002273812 A | 9/2002 |
| JP | 2003039590 A | 2/2003 |

(Continued)

OTHER PUBLICATIONS

Mitsubishi Chemical, Gohsenol technical information, downloaded on Jan. 28, 2021. (Year: 2021).*

(Continued)

*Primary Examiner* — Hui H Chin

(74) *Attorney, Agent, or Firm* — Marian E. Fundytus; Ostrolenk Faber LLP

(57) ABSTRACT

The present invention discloses gas and moisture vapor barrier coating compositions that comprise an amine modified polyvinyl alcohol and an acetoacetate modified polyvinyl. The barrier coatings of the invention exhibit enhanced gas and moisture vapor properties. The barrier coatings of the invention maintain gas and moisture vapor properties even after repeated flexing of a coated substrate.

22 Claims, No Drawings

(56) References Cited

FOREIGN PATENT DOCUMENTS

| | | |
|---|---|---|
| JP | 2005335110 A | 12/2005 |
| WO | WO 2015/157593 A1 | 10/2015 |

OTHER PUBLICATIONS

Supplementary European Search issued in counterpart European application No. EP 17 84 0199 dated Feb. 28, 2020.
International Preliminary Repot on Patentability issued in International Application No. PCT/US2017/046077, dated Feb. 12, 2019.
International Search Report issued in International Application No. CT/US 17/46077, dated Oct. 24, 2017.
Written Opinion of the International Searching Authority issued in International Application No. PCT/US 17/46077, dated Oct. 24, 2017.
Galikhanov, et al. (2015). Effect of aluminum oxide coating on structural, barrier and electret properties of polyethylene terephthalate films. Transactions on Dielectrics and Electrical Insulation, vol. 22, No. 3, 1492-1496.
Amberg-Schwab, et al. (2006). Development of passive and active barrier coatings on the basis of inorganic-organic polymers. Monatshefte für Chemie, 137, 657-666.
Office Action issued in counterpart Chinese application No. 2017800490676 dated Dec. 2, 2019, with English language translation thereof.
Office Action issued in counterpart European application No. 17840199.8 dated Jul. 16, 2020.
Office Action issued in counterpart Chinese application No. 2017800490676 dated Oct. 9, 2020, with English language translation thereof.
Office Action issued in counterpart Taiwanese application No. 106127295 dated Oct. 28, 2020, with English language translation thereof.

* cited by examiner

REINFORCEMENT BARRIER COATINGS

CROSS REFERENCE TO RELATED APPLICATIONS

The present application is a § 371 National Phase application based on PCT/US2017/046077 filed Aug. 9, 2017, which claims the benefit of U.S. Provisional Application Nos. 62/374,052 filed Aug. 12, 2016 and 62/407,105, filed Oct. 12, 2016, the subject matter of each of which is incorporated by reference in their entirety.

FIELD OF THE INVENTION

The present invention is related to gas barrier coating compositions, and substrates comprising the gas barrier coating compositions. The present invention is also related to articles comprising the substrates that comprise the gas barrier coating compositions. The gas barrier coatings of the present invention exhibit good gas barrier effects, water vapor blocking effects, and maintain the barrier properties even after repeated flexing.

BACKGROUND

Many packaged foods, pharmaceuticals, cosmetics, and the like, are sensitive to moisture, atmospheric oxygen and other gases. Vapors and aromas may also contaminate the contents of packages. Synthetic plastics, such as thermoplastic plastics, are commonly used in the fabrication of food, cosmetics, and pharmaceuticals packaging, for example. The plastic packaging provides some degree of protection from oxygen and other gases, as well as moisture. However, the barrier properties of the packaging are often enhanced by coating the plastic substrate with barrier coating compositions.

To improve gas barrier properties, polymeric films are often coated with inorganic layers, such as metals or metal oxides. However, gas barrier properties are reduced when these coated films are exposed to high temperatures and/or humidity, such as used for sterilization or pasteurization of packaged products. In addition, these inorganic coatings tend to be rather brittle, and crack when the substrate is flexed, reducing the gas barrier properties.

The polymeric films are often laminated, to produce a packaging material with several layers. Gas barrier coatings between the layers of films in laminates often impair the adhesion of one film to another. This can result in separation of the laminate layers when the material is flexed, thereby reducing the gas barrier properties of the laminate material.

U.S. Pat. No. 7,288,313 discloses a laminated material composed of a substrate which is coated with a thin vapor deposition layer, a gas barrier intermediate layer, and another thin vapor deposition layer. The vapor deposition layers are preferably metals or metal oxides. The gas barrier intermediate layer comprises water soluble polymers.

JP 2002-273812, JP 2001-145973, JP 2005-335110, US 2016/0009942 describe a transparent, flexible laminated material that is impact resistant, pinhole resistant, heat and humidity resistant, has excellent gas barrier properties, and is recyclable. The laminated material is a flexible film comprising one or more deposition thin film(s) of inorganic oxide, and a gas barrier coating layer. The gas barrier coating comprises at least one water-soluble polymer, and at least one metal alkoxide or a derivative thereof.

JP 2003-039590 discloses a transparent, flexible, lightweight laminate. A base film is coated with a gas barrier layer containing indium-cerium oxide, or a mixture of indium-cerium oxide and titanium oxide and/or tin oxide. A low refractive index layer is also applied, which can be an inorganic layer (such as $SiO_x$ or $AlO_x$) or an organic high polymer (e.g. acrylic resin).

WO 2015/157593 discloses a gas barrier film comprising a substrate with at least two coatings. The first coating comprises an inorganic oxide, metallic oxide, or metal. The second coating comprises a polyhydroxylic polymer, or a urethane-containing polymer.

US 2004/0115445 describes a gas barrier laminate comprising a substrate coated with three layers. The first layer is an inorganic oxide. The second (intermediate) layer contains at least a water-soluble polymer component. The third layer is another thin deposition of an inorganic oxide.

The gas barrier properties of $AlO_x$ coating are described in Galikhanov, et al. (2015). Effect of aluminum oxide coating on structural, barrier and electret properties of polyethylene terephthalate films. *Transactions on Dielectrics and Electrical Insulation*, Vol. 22, No. 3, 1492-1496. A second coating of hybrid inorganic-organic polymers on a coating of an inorganic oxide layer has been shown to further improve gas barrier properties. Amberg-Schwab, et al. (2006). Development of passive and active barrier coatings on the basis of inorganic-organic polymers. *Monatshefte für Chemie*, 137, 657-666.

There remains a need in the art for gas barrier coatings that maintain gas barrier properties, even in high humidity, and after flexing.

BRIEF SUMMARY OF THE INVENTION

The present invention provides gas barrier coatings comprising polyvinyl alcohols containing bulky functional groups. The gas barrier coatings of the present invention exhibit good oxygen and moisture vapor barrier properties, even at high temperatures and in high humidity, and maintain the gas and moisture vapor barrier properties even after repeated flexing.

In a particular aspect, the present invention provides a gas barrier coating composition comprising:
a) an amine modified polyvinyl alcohol; and
b) an acetoacetate modified polyvinyl alcohol.

In another aspect, the present invention provides a method of enhancing the gas barrier properties of a substrate by applying the gas barrier coating composition of the present invention onto the substrate, and drying the gas barrier coating composition on the substrate.

In one embodiment, the present invention provides a substrate comprising the gas barrier coating composition of the present invention.

In another embodiment, the present invention provides an article, such as a packaging article, comprising a substrate that comprises the gas barrier coating of the present invention.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

The present invention provides a gas and moisture barrier coating composition that comprises one or more amine modified polyvinyl alcohols (PVOH) and one or more acetoacetate modified PVOH. The barrier coating compositions may optionally comprise adhesion promoters and crosslinkers. The barrier coatings of the present invention are clear, flexible coatings that enhance the gas and vapor barrier properties of a variety of substrates. Advantageously, the barrier coating compositions maintain barrier properties even after repeated flexing of the coated substrate, for example flexible substrates that have a layer of vacuum or vapor deposited metal (i.e. metallized film), which tend to be quite brittle and easily damaged by repeated flexing.

The reinforcement barrier coating compositions of the present invention have the ability to block the ingress of aromas, oxygen, and other gases such as carbon dioxide and nitrogen. In addition, the barrier coating compositions can act as a mineral oil barrier, and also a barrier to low molecular weight migratables, such as plasticizers, adhesion promoters, antifoaming agents, and fillers. The barrier coating compositions of the present invention are also moisture vapor barriers. The barrier coating compositions of the present invention can be used to coat, and impart barrier properties to, a variety of materials, notably packaging for foods and pharmaceuticals, where exposure to oxygen and moisture need to be eliminated or restricted.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, "substrate" means any surface or object to which an ink or coating can be applied. Substrates include, but are not limited to, paper, fabric, plastic, plastic or polymer film, glass, ceramic, metal, wood, composites, and the like. Substrates may have one or more layers of metals or metal oxides, or other inorganic materials.

As used herein "article" or "articles" means a substrate or product of manufacture. Examples of articles include, but are not limited to: substrates such as paper, fabric, plastic, plastic or polymer film, glass, ceramic, metal, wood, composites, and the like; and products of manufacture such as publications (e.g. brochures), labels, and packaging materials (e.g. cardboard sheet or corrugated board), containers (e.g. bottles, cans), clothing, a polyolefin (e.g. polyethylene or polypropylene), a polyester (e.g. polyethylene terephthalate), a metalized foil (e.g. laminated aluminum foil), metalized polyester, a metal container, and the like.

As used herein, "amine modified polyvinyl alcohol," "amine modified PVOH," and the like refer to a polyvinyl alcohol (PVOH) polymer that has one or more reactive amine groups in the structure of the polymer backbone. The reactive amine groups may be pendant and/or terminal.

As used herein, "acetoacetate modified polyvinyl alcohol," "acetoacetate modified PVOH," and the like refer to a PVOH polymer that has one or more reactive acetoacetate groups in the structure of the polymer backbone. The reactive acetoacetate groups may be pendant and/or terminal.

As used herein, "gas and moisture vapor barrier coating composition(s)," "gas barrier coating composition(s)," "barrier coating composition(s)," "gas and moisture vapor barrier coating(s)," "gas barrier coating(s)," and "barrier coating(s)" generally refer to the coating composition of the present invention both prior to application in the ready to use state, and after application to a substrate and drying on the substrate.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

Gas and Moisture Vapor Barrier Coatings and Use Thereof

The barrier coating compositions of the present invention comprise PVOH modified by adding bulky reactive groups to the backbone of the PVOH. Specifically, the barrier coating compositions of the present invention comprise amine modified PVOH and acetoacetate modified PVOH.

The addition of these bulky groups to PVOH is generally believed to be detrimental to gas and moisture barrier properties. Most resins with gas barrier properties contain a polar group (e.g. hydroxyl group) to enhance intermolecular interaction, such as hydrogen bonding. If the polymer structure contains three-dimensionally bulky functional groups, the intermolecular interactions will be hindered, and there will be an increase in free volume, leading to deterioration in gas barrier properties (e.g. see U.S. Pat. No. 9,079,381). Hydrogen bonding in PVOH is an important factor for barrier properties, and introducing bulky groups can increase the free volume, therefore allowing gas or water to permeate more easily through the barrier coating or printed film. Additionally, reducing the hydroxyl content of PVOH by any process for introducing an acetoacetate or amine group has detrimental effects on barrier performance, and the level of modification is typically low (such as less than 12 mol %). It is generally believed to be well known that only fully hydrolyzed PVOH (i.e. greater than or equal to 96% hydrolysis) will show barrier properties. Introducing backbone modifications or using partially hydrolyzed PVOH (acetate or other groups replicating modification) will not provide desirable barrier properties because you are disrupting the hydrogen bonding, and introducing bulk or free volume. Thus, if a partially hydrolyzed PVOH, or a PVOH with a higher degree of modification, were used, the coating would provide some flex resistance, but if for any reason the underlying $AlO_x/SiO_x$ coating or metalized layer is compromised, these coatings will not provide any barrier.

Furthermore, it is generally believed that using both an amine modified PVOH and an acetoacetate modified PVOH in a single coating composition would significantly reduce the pot life, and severely limit its use. The reaction between the amine-functional PVOH and acetoacetate-functional PVOH can produce a gel within several hours, so that the time that the composition can be used is very limited in most converter type applications because of the low viscosity required during the print run.

Despite using both an amine modified PVOH and an acetoacetate modified PVOH in the gas barrier composition, the barrier coating compositions of the present invention advantageously do not gel as quickly, and have a longer pot life, and thus remain within a suitable viscosity for application in longer print runs.

Other advantages of the barrier coating compositions of the present invention include a reduced need for nanoparticulates (filler materials) to boost gas and moisture vapor properties, resulting in reduced health concerns; environmentally more favorable because there are no polyvinylidene dichloride (PVDC) type coatings or extruded films; low film weight applications; and PVOH solutions are easy to make at the correct temperature.

Suitable substrates for use in the present invention include, but are not limited to, non-transparent polymer coated with a metal, such as aluminum, nickel, or chromium (i.e. metallized films); and transparent polymer films having inorganic metal oxide, such as $AlO_x$ and $SiO_x$, layers. Suitable polymer films include, but are not limited to, polyethyleneterephthalate (PET), cast polypropylene (CPP), oriented polypropylene (OPP), biaxially oriented polypropylene (BOPP), polylactic acid (PLA), biaxially oriented polyamide (OPA), polyglycolic acid and the like. Metallized films include VM-CPP and VM-PE from Toray Advanced Film Co., Ltd. The barrier coating composition of the present invention can be used in monoweb and laminate structures, optionally in combination with inks. In two-ply structures, the barrier coating may be applied to the front web (e.g. $AlO_x$/PET or $AlO_x$/OPP), or the sealant web (e.g. VM-PE or VM-CPP), and, in both cases, will preferably be on the inner side of the laminate structure. The laminate structures may be used for applications including dry, moist, chilled, frozen, and wet food packaging, as well as potential industrial barrier applications.

Although the composition of the present invention is preferably used as a coating, it can be formulated at higher solids content to provide higher tack, and potentially used as a water-based, or hybrid water-based/solvent-based adhesive for lamination.

It is common for many applications for the reinforcement barrier coating to be sandwiched between two films of a laminate. The lamination bond strength between the films then becomes an issue. However, using the barrier coating composition of the present invention, bond strengths of greater than 1.0 N/15 mm, and preferably greater than 2.0 N/15 mm can be achieved. In addition, when the laminates were immersed in water, the bond strengths remained intact, and no delamination was observed. Pouches based on PET-PE, with polyethylene representing the heat sealing layer, do not delaminate between the PET-PE interface even after 24 hours immersed in water. The pouches are able to survive the pasteurization test with standard conditions set at 80° C. to 90° C. for 45 minutes. The reinforcement barrier coatings can be applied by various methods. In certain embodiments, the barrier coatings of the present invention would be applied via flexographic or gravure processes. However, it is to be understood that the present invention is not limited to these types of coatings applications, and any coating application suitable for the intended purpose could be used.

The barrier coating compositions of the present invention can be applied at low film weights. The barrier coating is typically applied at a wet film weight of about 2 to 12 $g/m^2$ (resulting in a film weight of between about 0.05 and 3.0 $g/m^2$ dry), without the need for fillers (e.g. Cloisite Na+, vermuculites, Somasif ME100, and the like). Even without fillers, the barrier coating of the present invention provides exceptional gas and moisture vapor barrier properties, at 0% to 90% relative humidity (RH), on metallized substrates, and on substrates such as $AlO_x$ and $SiO_x$ coated PET. It has been shown that a laminate material which provides an advantageous balance of properties can be obtained if the coating is applied such that:

$$X=(A/B)\times(C/D)>200$$

where:
  A=oxygen transmission rate (OTR) for the laminate at 23° C. and 50% relative humidity (RH) without the coating;
  B=OTR for the laminate at 23° C. and 50% RH with the coating;
  C=bond strength in N/15 mm after the adhesive has fully cured; and
  D=coating weight in $g/m^2$ (dry);
provided that:
  (A/B)>50;
  C>2; and
  D<0.6.

In certain embodiments, the barrier coating of the present invention is preferably used to enhance the gas and moisture vapor barrier properties of flexible substrates having either a metallized layer such as aluminium, or a layer of an inorganic oxide compound, such as aluminum oxides ($AlO_x$) or silicon oxides ($SiO_x$). The barrier coating of the present invention also protects the surface of these substrates. Metallized layers and inorganic compound layers may contain pinholes or may well be brittle or damaged during the converting processes, and well before the packaging process, due to poor flexing properties. Small fractures, pinholes, are enough to significantly reduce the barrier properties which are otherwise very good (e.g. undamaged $AlO_x$-PET OTR is 1-5 $cm^3/m^2$/day at 23° C. and 90% RH; and moisture vapor transmission rate (MVTR) is 1-5 $g/m^2$/day at 38° C. and 90% RH). Barrier performance varies with supplier and types of substrate and final application. Although there are currently commercially available barrier reinforcement coatings, they have disadvantages. For example, SunBar LP (Sun Chemical Corp.) contains nano-silica particles which cause diffraction of light (rainbow patterns) on the coated film prior to lamination. SunBar LP uses polyvinyl alcohols, which are known to be very effective in a range of barrier applications, but, due to the use of polyvinyl alcohols, gas barrier at high RH becomes compromised due to the sensitivity of the polyvinyl alcohol to moisture. The reinforcement barrier coatings of the present invention eliminate these problems because they comprise amine modified PVOH and acetoacetate modified PVOH, and contain little or no nanoparticulates.

The barrier coating compositions of the present invention are prepared by first making separate amine modified PVOH (Part A) and acetoacetate modified PVOH (Part B) solutions. For example, the Part A solution may comprise an amine modified PVOH, such as Ultiloc 5003 or Ultalux AD (both from Seksui Specialty Chemicals), in 70% water and 30% ethanol. The Part A solution may also contain one or more crosslinkers. The Part B solution may comprise an acetoacetate functionalized PVOH, such as Gohsefimer Z200 (Nippon Gohsei), in 70% water and 30% ethanol. To prepare the final barrier coating composition, the Part A and Part B solutions are mixed at room temperature to give a homogenous solution. A preferred ratio for the Part A and Part B solutions are 75-99% (by weight), preferably 80-97% (by weight) of Part A, and 1-25% (by weight), preferably 3-20% (by weight) of Part B. The Part A and Part B solutions are generally mixed in a ratio (by weight) of Part A:Part B of about 75:25 to 99:1. The amount of the Part A solution is set, and the amount of Part B solution is determined so that the sum of Part A plus Part B equals 100 wt %. The final amount of amine modified PVOH is always greater than the final amount of the acetoacetate modified PVOH, based on the total amount of PVOH in the barrier coating composition. For example the ratio of Part A:Part B can be about 80:20; or about 90:10; or about 94:6, or about 95:5; or about 97:3.

The Part A and Part B solutions are easily blended to make the barrier coating either as a 1 pack system, with a mixed pot life of about 24 hours, preferably up to about 36 hours, and most preferably up to about 48 hours. The barrier coating composition can also easily be blended starting from a stable 3 pack (i.e. separate packs of Part A, Part B, and crosslinker). Preferably, the barrier coating composition is provided as a stable 2 pack (i.e. separate packs of Part A with crosslinker, and Part B). Once the coating is blended, it is preferably used within 48 hours, preferably within 36 hours, and most preferably within 24 hours.

Use of either the Part A solution or the Part B solution alone would not provide the improved barrier properties of the barrier coating compositions of the present invention. The crosslinking between Parts A and B results in improved water resistance, and resistance to repeated flexing (e.g. Gelbo flexing).

The amine modified PVOH typically contains less than or equal to 40 mol % amine groups. For example, the amine modified PVOH may contain less than or equal to 25 mol % amine groups; or less than or equal to 12 mol % amine groups. The following method may be used to determine the total value of amines in the PVOH. Total amine value is the number of mg of potassium hydroxide (KOH) equivalent to the total amine hydrogen content (basicity) in 1 g of sample. If the sample is not already liquid, it is melted/dissolved by placing a flask containing the sample in a water bath. Mix the sample thoroughly, and weigh 1 to 4 g, to the nearest 0.0001 g (0.1 mg), into a 250 ml flask. Add 50 ml of water:alcohol (80:20), and boil for one minute to drive off any free ammonia that may be present. Cool to room temperature. Add 5 drops of bromphenol blue indicator, and titrate with 0.2 N HCl, while swirling, to the yellow end point (i.e. the sample solution turns yellow). Calculate the total amine value as follows:

Total amine value=$(V \times N \times 56.1)/S$ where:
V=volume (ml) HCl required for titration of sample solution to yellow end point
N=normality of the HCl solution
S=sample weight used, in g
56.1=the molecular weight of KOH (i.e. 56.1 g/mol)

PVOH is generally synthesized by hydrolyzing polyvinyl acetate. To make amine modified PVOH, amide compounds, such as vinylformamide, can be added during synthesis. Amine modified PVOH can also be made by reacting PVOH with amine compounds, such as an amino acetal (e.g. see U.S. Pat. No. 2,739,059), 3-(dimethylamino)propylamine, 3-amino-1-propanol, 3-methoxyethyleamine, methoxypropylamine, aminoethoxy-ethanol, 3-amino-1,2-propanediol, aminoethylethanolamine, allylamine, 3-aminopropylsulphonate, 3-aminopropylcarboxylate, and combinations thereof (e.g. see U.S. Pat. No. 7,714,086). Another method for preparing amine modified PVOH is by graft polymerizing PVOH with ethylenically unsaturated monomers containing primary, secondary, tertiary, or quaternary amine functionality (e.g. see U.S. Pat. No. 6,348,256).

Acetoacetate modified PVOH can be made by reacting PVOH with a diketene compound, or ester exchange with t-butyl acetoacetate (e.g. see U.S. Pat. No. 8,679,536).

Amine modified PVOH is typically present in the Part A solution in an amount of about 0.1 wt % to about 10 wt %, based on the total weight of the Part A solution. For example, the amine modified PVOH may be present in the Part A solution in an amount of about 0.1 wt % to about 9.5 wt %; or about 0.1 wt % to about 9 wt %; or about 0.1 wt % to about 8.5 wt %; or about 0.1 wt % to about 8 wt %; or about 0.1 wt % to about 7.5 wt %; or about 0.1 wt % to about 7 wt %; or about 0.1 wt % to about 6.5 wt %; or about 0.1 wt % to about 6 wt %; or about 0.1 wt % to about 5.5 wt %; or about 0.1 wt % to about 5 wt %; or about 0.1 wt % to about 4.5 wt %; or about 0.1 wt % to about 4 wt %; or about 0.1 wt % to about 3.5 wt %; or about 0.1 wt % to about 3 wt %; or about 0.1 wt % to about 2.5 wt %; or about 0.1 wt % to about 2 wt %; or about 0.1 wt % to about 1.5 wt %; or about 0.1 wt % to about 1 wt %; or about 0.1 wt % to about 0.5 wt %; or about 0.5 wt % to about 10 wt %; or about 0.5 wt % to about 9.5 wt %; or about 0.5 wt % to about 9 wt %; or about 0.5 wt % to about 8.5 wt %; or about 0.5 wt % to about 8 wt %; or about 0.5 wt % to about 7.5 wt %; or about 0.5 wt % to about 7 wt %; or about 0.5 wt % to about 6.5 wt %; or about 0.5 wt % to about 6 wt %; or about 0.5 wt % to about 5.5 wt %; or about 0.5 wt % to about 5 wt %; or about 0.5 wt % to about 4.5 wt %; or about 0.5 wt % to about 4 wt %; or about 0.5 wt % to about 3.5 wt %; or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %; or about 1 wt % to about 10 wt %; or about 1 wt % to about 9.5 wt %; or about 1 wt % to about 9 wt %; or about 1 wt % to about 8.5 wt %; or about 1 wt % to about 8 wt %; or about 1 wt % to about 7.5 wt %; or about 1 wt % to about 7 wt %; or about 1 wt % to about 6.5 wt %; or about 1 wt % to about 6 wt %; or about 1 wt % to about 5.5 wt %; or about 1 wt % to about 5 wt %; or about 1 wt % to about 4.5 wt %; or about 1 wt % to about 4 wt %; or about 1 wt % to about 3.5 wt %; or about 1 wt % to about 3 wt %; or about 1 wt % to about 2.5 wt %; or about 1 wt % to about 2 wt %; or about 1 wt % to about 1.5 wt %.

The acetoacetate modified PVOH typically contains less than or equal to 40 mol % acetoacetate groups. For example, the acetoacetate modified PVOH may contain less than 30 mol % acetoacetate groups, or less than 10 mol % acetoacetate groups, or less than 5 mol % acetoacetate groups. The presence of acetoacetate groups, typically for $CH_3C(O)CH_2C(O)O$—, can be confirmed using $^1H$ proton and $^{13}C$ NMR (100-300 MHz). In the present invention, infrared (IR) spectroscopy was used to confirm the presence of the carbonyl groups in $CH_3C(O)CH_2C(O)$—. Carbonyl groups absorb strongly in the range of 1650 to 1750 $cm^{-1}$, confirming the presence of two carbonyl bands in the acetoacetate modified PVOH.

Acetoacetate modified PVOH is typically present in the Part B solution in an amount of about 0.1 wt % to about 10 wt %, based on the total weight of the Part B solution. For example, the acetoacetate modified PVOH may be present in the Part B solution in an amount of about 0.1 wt % to about 9.5 wt %; or about 0.1 wt % to about 9 wt %; or about 0.1 wt % to about 8.5 wt %; or about 0.1 wt % to about 8 wt %; or about 0.1 wt % to about 7.5 wt %; or about 0.1 wt % to about 7 wt %; or about 0.1 wt % to about 6.5 wt %; or about 0.1 wt % to about 6 wt %; or about 0.1 wt % to about 5.5 wt %; or about 0.1 wt % to about 5 wt %; or about 0.1 wt % to about 4.5 wt %; or about 0.1 wt % to about 4 wt %; or about 0.1 wt % to about 3.5 wt %; or about 0.1 wt % to about 3 wt %; or about 0.1 wt % to about 2.5 wt %; or about 0.1 wt % to about 2 wt %; or about 0.1 wt % to about 1.5 wt %; or about 0.1 wt % to about 1 wt %; or about 0.1 wt % to about 0.5 wt %; or about 0.5 wt % to about 10 wt %; or about 0.5 wt % to about 9.5 wt %; or about 0.5 wt % to about 9 wt %; or about 0.5 wt % to about 8.5 wt %; or about 0.5 wt % to about 8 wt %; or about 0.5 wt % to about 7.5 wt %; or about 0.5 wt % to about 7 wt %; or about 0.5 wt % to about 6.5 wt %; or about 0.5 wt % to about 6 wt %; or about 0.5 wt % to about 5.5 wt %; or about 0.5 wt % to about 5 wt %; or about 0.5 wt % to about 4.5 wt %; or about 0.5 wt % to about 4 wt %; or about 0.5 wt % to about 3.5 wt %; or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %; or about 1 wt % to about 10 wt %; or about 1 wt % to about 9.5 wt %; or about 1 wt % to about 9 wt %; or about 1 wt % to about 8.5 wt %; or about 1 wt % to about 8 wt %; or about 1 wt % to about 7.5 wt %; or about 1 wt % to about 7 wt %; or about 1 wt % to about 6.5 wt %; or about 1 wt % to about 6 wt %; or about 1 wt % to about 5.5 wt %; or about 1 wt % to about 5 wt %; or about 1 wt % to about 4.5 wt %; or about 1 wt % to about 4 wt %; or about 1 wt % to about 3.5 wt %; or about 1 wt % to about 3 wt %; or about 1 wt % to about 2.5 wt %; or about 1 wt % to about 2 wt %; or about 1 wt % to about 1.5 wt %.

The amine modified PVOH is typically present in the gas barrier coating composition in an amount of about 50 wt % to about 99.9 wt %, based on the total weight of PVOH in gas barrier coating composition. For example, the amine modified PVOH may be present in the gas barrier coating composition in an amount of about 50 wt % to about 99 wt %, based on the total weight of the PVOH in the gas barrier coating composition; or about 50 wt % to about 95 wt %; or about 50 wt % to about 90 wt %; or about 50 wt % to about 85 wt %; or about 50 wt % to about 80 wt %; or about 50 wt % to about 75 wt %; or about 50 wt % to about 70 wt %; or about 50 wt % to about 65 wt %; or about 50 wt % to about 55 wt %; or about 55 wt % to about 99.9 wt %; or about 55 wt % to about 99 wt %; or about 55 wt % to about 95 wt %; or about 55 wt % to about 90 wt %; or about 55 wt % to about 85 wt %; or about 55 wt % to about 80 wt %; or about 55 wt % to about 75 wt %; or about 55 wt % to about 70 wt %; or about 55 wt % to about 65 wt %; or about 55 wt % to about 60 wt %; or about 60 wt % to about 99.9 wt %; or about 60 wt % to about 99 wt %; or about 60 wt % to about 95 wt %; or about 60 wt % to about 90 wt %; or about 60 wt % to about 85 wt %; or about 60 wt % to about 80 wt %; or about 60 wt % to about 75 wt %; or about 60 wt % to about 70 wt %; or about 60 wt % to about 65 wt %; or about 65 wt % to about 99.9 wt %; or about 65 wt % to about 99 wt %; or about 65 wt % to about 95 wt %; or about 65 wt % to about 90 wt %; or about 65 wt % to about 85 wt %; or about 65 wt % to about 80 wt %; or about 65 wt % to about 75 wt %; or about 65 wt % to about 70 wt %; or about 70 wt % to about 99.9 wt %; or about 70 wt % to about 99 wt %; or about 70 wt % to about 95 wt %; or about 70 wt % to about 90 wt %; or about 70 wt % to about 85 wt %; or about 70 wt % to about 80 wt %; or about 70 wt % to about 75 wt %; or about 75 wt % to about 99.9 wt %; or about 75 wt % to about 99 wt %; or about 75 wt % to about 95 wt %; or about 75 wt % to about 90 wt %; or about 75 wt % to about 85 wt %; or about 75 wt % to about 80 wt %; or about 80 wt % to about 99.9 wt %; or about 80 wt % to about 99 wt %; or about 80 wt % to about 95 wt %; or about 80 wt % to about 90 wt %; or about 80 wt % to about 85 wt %; or about 85 wt % to about 99.9 wt %; or about 85 wt % to about 99 wt %; or about 85 wt % to about 95 wt %; or about 85 wt % to about 90 wt %.

The acetoacetate modified PVOH is typically present in the gas barrier coating composition in an amount of about 0.1 wt % to about 50 wt %, based on the total weight of PVOH in the gas barrier coating composition. For example, the acetoacetate modified PVOH may be present in an amount of about 0.1 wt % to about 45 wt %; or about 0.1 wt % to about 40 wt %; or about 0.1 wt % to about 35 wt %; or about 0.1 wt % to about 30 wt %; or about 0.1 wt % to about 25 wt %; or about 0.1 wt % to about 20 wt %; or about 0.1 wt % to about 15 wt %; or about 0.1 wt % to about 10 wt %; or about 0.1 wt % to about 5 wt %; or about 0.1 wt % to about 1 wt %; or about 0.1 wt % to about 0.5 wt %; or about 0.5 wt % to about 50 wt %; or about 0.5 wt % to about 45 wt %; or about 0.5 wt % to about 40 wt %; or about 0.5 wt % to about 35 wt %; or about 0.5 wt % to about 30 wt %; or about 0.5 wt % to about 25 wt %; or about 0.5 wt % to about 20 wt %; or about 0.5 wt % to about 15 wt %; or about 0.5 wt % to about 10 wt %; or about 0.5 wt % to about 5 wt %; or about 0.5 wt % to about 1 wt %; or about 1 wt % to about 50 wt %; or about 1 wt % to about 45 wt %; or about 1 wt % to about 40 wt %; or about 1 wt % to about 35 wt %; or about 1 wt % to about 30 wt %; or about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %.

The gas barrier coating compositions of the present invention may further comprise one or more additional polymers. Suitable additional polymers include, but are not limited to, fully or partially hydrolyzed polyvinyl alcohol, fully or partially hydrolyzed polyvinyl alcohol and ethylene vinyl alcohol (EVOH) copolymers, water based acrylics, acrylic urethanes, polyurethanes, combinations thereof, and the like. When present, the one or more additional polymers are generally present in an amount of 0.1 to 5 wt %, based on the total weight of the barrier coating composition. For example, the one or more additional polymers may be present in an amount of 0.1 wt % to about 4.5 wt %; or about 0.1 wt % to about 4 wt %; or about 0.1 wt % to about 3.5 wt %; or about 0.1 wt % to about 3 wt %; or about 0.1 wt % to about 2.5 wt %; or about 0.1 wt % to about 2 wt %; or about 0.1 wt % to about 1.5 wt %; or about 0.1 wt % to about 1 wt %; or about 0.1 wt % to about 0.5 wt %; or about 0.5 wt % to about 5 wt %; or about 0.5 wt % to about 4.5 wt %; or about 0.5 wt % to about 4 wt %; or about 0.5 wt % to about 3.5 wt %; or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %; or about 1 wt % to about 5 wt %; or about 1 wt % to about 4.5 wt %; or about 1 wt % to about 4 wt %; or about 1 wt % to about 3.5 wt %; or about 1 wt % to about 3 wt %; or about 1 wt % to about 2.5 wt %; or about 1 wt % to about 2 wt %; or about 1 wt % to about 1.5 wt %.

The barrier coating compositions of the present invention may further comprise one or more crosslinking agents. The crosslinking agents may either be added to the Part A solution, prior to mixing with the Part B solution, or may be added to the coating composition after Part A and Part B have been mixed. When present, the crosslinking agent is generally present in an amount of about 5% to 25% relative to the total weight of the PVOH components. For example, relative to the total weight of the PVOH components, the crosslinking agent may be present in an amount of about 5% to about 20%; or about 5% to about 15%; or about 5% to about 10%; or about 5% to about 8%.

Suitable crosslinking agents include, but are not limited to, ammonium zirconium, ammonium zirconium carbonate; zinc carbonates, such as ammonium zinc carbonate; other metal carbonates; acetyl acetonates; ketones; aldehydes and dialdehydes, such as formaldehyde, acetaldehyde, glyoxal, and glutaraldehyde; polymeric aldehydes; epoxysilanes, such as 3-glycidoxypropyltrimethoxysilane, 3-glycidoxypropylmethyldiethoxysilane, and 2-(3,4-epoxycyclohexyl)ethyltrimethoxysilane; aminosilanes, such as 3-amino-propyltrimethoxysilane, 3-aminopropyltriethoxysilane, N-(2-aminoethyl)-3-aminopropylmethyldimethoxysilane, aminoethylaminotrimethoxysilane, and aminoethylaminopropylsiloxane; alkoxy silanes, such as methyltrimethoxysilanes, methyltriethoxysilane, dimethoxysilane, isobutyltrimethoxysilane, phenyltriethoxysilane, n-octyltriethoxysilane, vinyltrimethoxysilane, and vinyltriacetoxysilane. Carbonyl and/or epoxy containing polymer additives comprising monomer units of vinyl alkyl ketone may also be used as crosslinkers, and include, but are not limited to, vinyl methyl ketone, vinyl ethyl ketone, diacetone acrylamide, diacetone(meth)acrylamide, diacetone (meth)acrylate, Examples of epoxy containing polymers include, but are not limited to, glycidyl meth(acrylate), β-methylglycidyl meth(acrylate), 3,4-epoxycyclohexylmethyl meth(acrylate), allylglycidyl ether, and the like. Azlactone derivatives containing azlactone functionality are also suitable crosslinkers. Other crosslinkers include aldehyde-PEG-NHS and acetal-PEG-NHS, such as ethylene glycol-bis(succinic acid N-hydroxysuccinimide ester), sebacic acid-bis(N-succinimidyl ester), di(N-succinimidyl) glutarate, N,N'-disuccinimidyl oxalate. The crosslinking agents may be present individually, or as combinations of two or more.

Advantageously, metal-based crosslinkers may also act as stabilizers in the barrier coating compositions of the present invention, inhibiting premature gelling of the composition. It is common and well known in the art that metal chelation (Zr, Zn, Cu, Ag, and Ni) occurs in the presence of acetoacetate functionality. For example, ammonium zirconium carbonate is known to crosslink a variety of functional groups, such as, for example, carboxyl groups to provide water/solvent resistance. However, in the presence of the acetoacetate modified PVOH, zirconium may well chelate to the acetoacetate group, slowing reaction of the amine and acetoacetate groups, providing additional stability and pot life of the mixed Part A and Part B solutions of the present invention.

The barrier coating compositions of the present invention may further comprise one or more adhesion promoters. Adhesion promoters include, but are not limited to, alkylsilanes such as methyltrimethoxysilanes, methyltriethoxysilane, dimethoxysilane, osobutyltrimethoxysilane, phenyltriethoxysilane, n-octyltriethoxysilane, vinyltrimethoxysilane, vinyltriacetoxysilane. Titanates and zirconates can also be used as adhesion promoters, and include, but are not limited to, tetralkyl titanates, titanium ammonium lactate, diisopropoxy-bisethylacetoacetatotitanate, titanium triethanolamine complex, dihydroxy titanium bis(ammonium lactate), zirconium lactate, sodium salt, and sodium zirconium glycolate. In certain embodiments, additives that provide crosslinking may also provide adhesion to the substrate. The adhesion promoters may be present individually or as combinations of two or more. When present, adhesion promoters are generally present in the barrier composition in an amount of 0.1 to 5 wt %, based on the total weight of the gas barrier coating composition. For example, the adhesion promoters may be present in an amount of about 0.1 wt % to about 5 wt %, based on the total weight of the barrier coating composition. For example, these other additives may each independently be present in an amount of about 0.1 wt % to about 4.5 wt %; or about 0.1 wt % to about 4 wt %; or about 0.1 wt % to about 3.5 wt %; or about 0.1 wt % to about 3 wt %; or about 0.1 wt % to about 2.5 wt %; or about 0.1 wt % to about 2 wt %; or about 0.1 wt % to about 1.5 wt %; or about 0.1 wt % to about 1 wt %; or about 0.1 wt % to about 0.5 wt %; or about 0.5 wt % to about 5 wt %; or about 0.5 wt % to about 4.5 wt %; or about 0.5 wt % to about 4 wt %; or about 0.5 wt % to about 3.5 wt %; or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %; or about 1 wt % to about 5 wt %; or about 1 wt % to about 4.5 wt %; or about 1 wt % to about 4 wt %; or about 1 wt % to about 3.5 wt %; or about 1 wt % to about 3 wt %; or about 1 wt % to about 2.5 wt %; or about 1 wt % to about 2 wt %; or about 1 wt % to about 1.5 wt %.

Other additives that may be added to the barrier coating compositions of the present invention include, but are not limited to, antifoaming agents, de-aerators, surface active agents, surfactants, dispersants, and other additives known in the art which may provide improvements in preparation of the coating and coating solutions, appearance of the coated film, or improve any aspect of the coated film properties, combinations thereof, and the like. When present, these other additives are generally each independently present in the barrier coating in an amount of about 0.1 wt % to about 5 wt %, based on the total weight of the barrier coating composition. For example, these other additives may each independently be present in an amount of about 0.1 wt % to about 4.5 wt %; or about 0.1 wt % to about 4 wt %; or about 0.1 wt % to about 3.5 wt %; or about 0.1 wt % to about 3 wt %; or about 0.1 wt % to about 2.5 wt %; or about 0.1 wt % to about 2 wt %; or about 0.1 wt % to about 1.5 wt %; or about 0.1 wt % to about 1 wt %; or about 0.1 wt % to about 0.5 wt %; or about 0.5 wt % to about 5 wt %; or about 0.5 wt % to about 4.5 wt %; or about 0.5 wt % to about 4 wt %; or about 0.5 wt % to about 3.5 wt %; or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %; or about 1 wt % to about 5 wt %; or about 1 wt % to about 4.5 wt %; or about 1 wt % to about 4 wt %; or about 1 wt % to about 3.5 wt %; or about 1 wt % to about 3 wt %; or about 1 wt % to about 2.5 wt %; or about 1 wt % to about 2 wt %; or about 1 wt % to about 1.5 wt %.

Although the barrier coating compositions of the present invention are typically supplied without colorants, it would be possible to add colorants to provide a tinted or colored reinforcement barrier coating. Examples of suitable colorants include, but are not limited to, organic or inorganic pigments, and dyes. The dyes include, but are not limited to, fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired. When present, dyes and organic pigments are typically present in an amount of about 0.1 wt % to about 10 wt %, based on the total weight of the barrier coating composition. When present, inorganic pigments are typically present in an amount of about 0.1 wt % to about 40 wt %, based on the total weight of the barrier coating composition.

The barrier coating compositions of the present invention are preferably free of nanoparticulates (filler materials), which are commonly used to boost gas and moisture vapor properties of currently available barrier coatings. However, the barrier coating compositions may optionally contain nanoparticulates in an amount of less than 30 wt %, preferably less than 15 wt %, and more preferably less than 5 wt %. Most preferably, the barrier coating compositions of the present invention do not contain any nanoparticulates. Due to the absence of nanoparticulates, health concerns are reduced. Suitable nanoparticulates include, but are not limited to, kaolinite, monmorillonite, atapulgite, illite, benton-ite, halloysite, kaolin, mica, vermiculite, diatomaceous earth and fuller's earth, calcined aluminum silicate, hydrated aluminum silicate, magnesium aluminum silicate, sodium silicate, magnesium silicate, combinations thereof, and the like.

The total solids content of the barrier coating compositions of the present invention is typically 3 wt % to 20 wt %, based on the total weight of the gas barrier coating composition. For example, the solids content of the barrier coating composition may be 3 wt % to 15 wt %; or 3 wt % to 10 wt %; or 3 wt % to 5 wt %; or 5 wt % to 20 wt %; or 5 wt % to 15 wt %; or 5 wt % to 10 wt %.

The barrier coating compositions of the present invention may optionally contain one or more solvents. When present, the solvents are typically present in an amount of about 1 wt % to about 50 wt %, based on the total weight of the barrier coating composition. For example, the solvents may be present in an amount of about 1 wt % to about 50 wt %; or about 1 wt % to about 45 wt %; or about 1 wt % to about 40 wt %; or about 1 wt % to about 35 wt %; or about 1 wt % to about 30 wt %; or about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %. Suitable solvents include, but are not limited to, water, alcohols, ketones, esters, combinations thereof, and the like.

EXAMPLES

The following examples illustrate specific aspects of the present invention, and are not intended to limit the scope thereof in any respect, and should not be so construed.

Test Methods
% Non-Volatile Content (% NVC)

Approximately 1 g of a coating was added into a petri dish, and the actual weight was recorded to two decimal places. The petri dish was then placed in an electrically heated fan assisted oven for 30 minutes at 150° C. The sample was then cooled to room temperature and re-weighed. The % NVC was calculated as follows:

% NVC=(final weight of dry coating (grams)/Initial weight of wet coating (grams))×100

Viscosity

Viscosity was measured using a Brookfield DV-II+ Pro Viscometer, at 25° C. A LV 2 spindle was used, and the samples were tested at a shear rate of 60 rpm. Viscosity was reported as mPa·s.

Storage Stability

An initial viscosity of coating solution was measured using (Seta) Zahn cup #2 at 23° C. The initial viscosity was considered the application viscosity. 100 g of the coating solution component A and B was placed in a tightly sealed glass jar in a refrigerator set at 4° C. The sample was taken out periodically (Every 4-5 days) and its viscosity measured. Changes in viscosity or appearance and homogeneity were considered negative factors, such as increases in viscosity to more than 25 seconds for gravure, and more than 30 seconds for flexographic printing processes. No visible phase separation is preferred. No clouding of solution of greater than 20 FTUs (units haze) is preferred. The turbidity is reported as Formazin Turbidity Units (FTU).

Oxygen Transmission Rate (OTR)

The oxygen transmission rates (OTR) of the coatings when applied to a polyester film were determined on a Mocon Oxtran 2/21 gas permeability tester at 23° C. and 90% relative humidity. This condition represents the normal test protocol for dry food packaging. This means that the permeant gas ($O_2$) is adjusted to 90% RH (23° C.) and the carrier gas (100% $N_2$) to 90% RH (23° C.). In addition, Mocon Oxtran 2/21 gas permeability tester at 23° C. and 50/50% relative humidity conditions were also evaluated.

The coatings were applied with a No. 0 K-Bar (ex. RK Print), delivering about 4 g/m² wet film weight, and were dried in a warm flow of air (lab prints were dried with a hair dryer).

The OTR's of the reinforcement coating on either metallized coated films and $AlO_x$ or $SiO_x$ coated barrier films were assessed.

Adhesion

Adhesion was measured using DRG 1112 polypropylene tape. A strip of the 25 mm wide tape is pressed firmly onto a dried coating sample on the substrate of interest prepared as described in the OTR test above, and removed in several ways. Firstly by pulling the tape back upon itself at 180° very quickly. Secondly by jerking the tape off at 90° and finally repeating the first test but at a very slow speed (e.g. 20 mm/min). The results are reported as "pass" or "fail," where "pass" means that no coating was removed.

Lamination Bond Strength

Laminates were prepared by applying the reinforcement coating to either a metallized coated film or an $AlO_x$ or $SiO_x$ coated barrier films. An adhesive was applied over the top of the dried reinforcement coating then laminated to the treated side of a 30 μm gauge poly (ethylene) film. The adhesive used was supplied by DIC-Sun Chemical (Sunlam LX-415A and Sunlam SP-75 and was prepared according to the manufacturer's instructions and applied so as to achieve a final dry film weight of 3 g/m². The laminates were then stored for 14 days at 25° C. to ensure full cure of the isocyanate-based adhesive. Bond strengths were measured on a JJ Lloyd LRX tensiometer using a cross head speed of 30 mm/min under 'T' peel separation conditions. Laminate samples were 15 mm wide and results are given in grams force per 15 mm. Laminates prepared in to pouches for pasteurization and retort tests used a different adhesive supplied by DIC-Sun Chemical, LX500 and KW-75 and was prepared according to the manufacturer's instructions and applied so as to achieve a final dry film weight of 4 g/m².

Pasteurization Test

Pouches were prepared based on $AlO_x$ or $SiO_x$ PET-Reinforcement barrier coating-adhesive-PE laminate structures, and sealed using a heat sealer, using the PE as the heat sealing layer. Pouches were then placed in a beaker of water at 85° C. for 45 minutes. A "pass" rating was given if the pouch did not delaminate between the PET-PE layer and no visible bubbles appeared in the clear laminate.

24 hr Water Immersion Test

Coating samples were coated on to the desired substrate (e.g. $AlO_x$ or $SiO_x$ PET) and laminated to PE with an adhesive. Laminates were then converted into pouches using a RDM HSE-3 Laboratory Heat Sealer. The heat seal jaws were set at 150° C. for 1 sec dwell time at 50 psi. The pouches were prepared containing 100% relative humidity to simulate wet food. Pouches were then placed in a bucket of tap water ensuring that the pouch is fully immersed for 24 hours to determine if delamination has occurred. Delamination typically occurs via the ingress of water between the $AlO_x$ or $SiO_x$ PET substrate and the PE. A "pass" rating was given if the pouch did not delaminate between the PET-PE layer and no visible bubbles appeared in the clear laminate.

Gelbo Flex Test

Gelbo flex testing is a test to measure the flex durability of flexible barrier coatings. Gelbo flex tests if the flexible barrier coating is resistant against repetitive strain, which is called flex durability, or Gelbo flex. A typical test sample size is 200 by 280 mm, which is attached to the Gelbo flex tester apparatus (Gelbo Flex Test Model No. G0002, from IDM Instruments). The flexing action consists of a twisting motion combined with a horizontal motion (compression), thus repeatedly twisting and crushing the film. The test set up gives a twisting motion of 440° in the first 90 mm of the stroke and is followed by a straight horizontal motion of 65 mm. The speed is up to 50 cycles per minute. The oxygen transmission rate of the coating is measured before and after Gelbo flexing to indicate any changes in barrier performance.

Preparation of Part a and Part B PVOH Solutions

Part A1—Amine Modified PVOH with Crosslinker Solution

A solution of an amine modified PVOH (Ultiloc 5003 from Sekisui) in water/ethanol was prepared according to the formulation in Table A1 (% by wt.). Part A1 solution included a stabilized ammonium zirconium carbonate crosslinker (Bacote 20 from MEL Chemicals). Viscosity (using Brookfield viscometer) and % NVC were measured as described above.

TABLE A1

| Formulation of Part A1 | |
|---|---|
| Material | % |
| Ultiloc 5003 Ex. Sekisui | 6.5 |
| [1] Deionized Water | 64.5 |

TABLE A1-continued

| Formulation of Part A1 | |
|---|---|
| Material | % |
| Ethanol | 28.0 |
| Bacote 20 Ex. MEL Chemicals | 1.0 |
| Total | 100.0 |
| % NVC | 6.7 |
| Viscosity (mPa · s) | 80 |

Part A2—Amine Modified PVOH without Crosslinker Solution

A solution of an amine modified PVOH (Ultiloc 5003 from Sekisui) in water/ethanol was prepared according to the formulation in Table A2 (% by wt.). Viscosity (using Brookfield viscometer) and % NVC were measured as described above.

TABLE A2

| Formulation of Part A2 | |
|---|---|
| Material | % |
| Ultiloc 5003 Ex. Sekisui | 6.5 |
| [1] Deionized Water | 65.5 |
| Ethanol | 28.0 |
| Total | 100.0 |
| % NVC | 6.5 |
| Viscosity (mPa · s) | 75 |

Part B—Acetoacetate Modified PVOH Solution

A solution of an acetoacetate modified PVOH (Gohsefimer Z200 from Nippon-Gohsei) in water/ethanol was prepared according to the formulation in Table B (% by wt.). Viscosity (using Brookfield viscometer) and % NVC were measured as described above.

TABLE B

| Formulation of Part B | |
|---|---|
| Material | % |
| Gohsefimer Z200 (Ex. Nippon-Gohsei) | 2.52 |
| [1] Deionized Water | 68.24 |
| Ethanol | 29.24 |
| Total | 100.00 |
| % NVC | 2.52 |
| Viscosity (mPa · s) | 20 |

[1] Preferably, deionized water is used, but tap water, distilled, spring water, filtered water, etc. could also be used.

Examples 1 to 5. Barrier Coatings Comprising Amine Modified PVOH with Crosslinker and Acetoacetate Modified PVOH Barrier coating compositions Examples 1 to 5 comprising amine modified PVOH with a crosslinker (Part A1) and acetoacetate modified PVOH (Part B) were prepared by mixing Part A1 and Part B in various ratios. The formulations of Examples 1 to 5, as % by weight (wt %) of each material, are shown in Table 1.

The storage stability of Examples 1 to 5 was tested as described above. All of Examples 1 to 5 passed the storage stability test.

TABLE 1

| | Ex. 1 | Ex. 2 | Ex. 3 | Ex. 4 | Ex. 5 |
|---|---|---|---|---|---|
| Part A1 | 95.00 | 97.00 | 94.00 | 90.00 | 80.00 |
| Part B | 5.00 | 3.00 | 6.00 | 10.00 | 20.00 |
| Total | 100.00 | 100.00 | 100.00 | 100.00 | 100.00 |

Formulations of Examples 1 to 5

Example 6. Standard Commercially Available Reinforcement Coating System

SunBar LP 2-pack barrier reinforcement coating system was used as a comparative barrier coating. SunBar LP SX001 is a PVOH solution, and SunBar LP SX004 is a clay dispersion. The mixing ratio of the two components is shown in Table 2.

TABLE 2

Formulation of SunBar LP

| Material | Ex. 6 | Ex. 6a |
|---|---|---|
| SunBar LP SX001 | 66.67 | 100.00 |
| SunBar LP SX004 | 33.33 | 0.00 |
| Total | 100.00 | 100.00 |

Examples 7 to 9. Barrier Coatings Comprising Amine Modified PVOH and Acetoacetate Modified PVOH Barrier coating compositions Examples 7 to 9 comprising amine modified PVOH (Part A2) and acetoacetate modified PVOH (Part B) were prepared by mixing Part A2 and Part B in various ratios. The barrier coatings of Examples 7 to 9 do not contain a crosslinker. The formulations of Examples 7 to 9, as % by weight (wt %) of each material, are shown in Table 3.

The storage stability of Examples 7 to 9 was tested as described above. All of Examples 7 to 9 passed the storage stability test.

TABLE 3

Formulations of Examples 7 to 9

| | Ex. 7 | Ex. 8 | Ex. 9 |
|---|---|---|---|
| Part A2 | 95.00 | 97.00 | 90.00 |
| Part B | 5.00 | 3.00 | 10.00 |
| Total | 100.00 | 100.00 | 100.00 |

Example 10. Oxygen Barrier Properties of Examples 1, 4, 5, and 6 on $AlO_x$/PET Films Examples 1, 4, and 5, and comparative Example 6, were printed as monoweb laboratory prints using No. 0 K Bar at a wet film weight of 4 g/m², and dried using a hair dryer on various films with inorganic layers. Oxygen transmission rate was measured as described above, and is reported as cm³/m²/day. Table 4 shows the OTR for each example printed on Toyobo VE100 Film (PET film with vapor deposition of ceramic (silica/alumina)). Table 5 shows the OTR for each example printed on Toray Barrialox Film ($AlO_x$/PET).

TABLE 4

OTR of Examples 1, 4, 5, and 6 printed on Toyobo VE100 Film

| | OTR at 50% RH | OTR at 50% RH after 20 Gelbo Flexes | OTR at 90% RH |
|---|---|---|---|
| Ex. 1 | 0.20 | 0.07 | 1.25 |
| Ex. 4 | 0.09 | 0.26 | 0.42 |
| Ex. 5 | 0.02 | 0.14 | 1.31 |
| Ex. 6 | 0.45 | 2.19 | 2.24 |
| Ex. 6a | 2.00 | 4.00 | 6.00 |

TABLE 5

OTR of Examples 1 and 6 on Toray Barrialox Film

| | OTR at 50% RH | OTR at 50% RH after 20 Gelbo Flexes | OTR at 90% RH |
|---|---|---|---|
| Ex. 1 | 0.12 | 0.28 | 7.87 |
| Ex. 6 | 0.79 | 1.77 | 0.42 |

The results in Tables 4 and 5 show that the barrier coatings of the present invention (Examples 1, 4, and 5) exhibit better oxygen barrier properties than a commercially available barrier coating (Example 6) before and after Gelbo flexing, and at high relative humidity.

Example 11. Drying Speed and OTR of Barrier Coatings Printed on a Flexographic Press Example 1 and comparative Example 6 were printed on an $AlO_x$/PET film from Ultimate Packaging, and the limit of drying speed (in m/min) and OTR were measured. The drying speed was assessed by measuring adhesion of the coating to the substrate as described above. The results are shown in Table 6.

TABLE 6

Drying speed and OTR of barrier coatings printed on flexographic press

| | Limit of drying speed (m/min) | OTR at 50% RH |
|---|---|---|
| Ex. 1 | 130 | 1.70 |
| Ex. 6 | 50 | 0.35 |

The results in Table 6 show that the limit of drying speed for comparative Example 6 was 50 m/min. Conversely, Example 1 showed good adhesion to the substrate at speeds of 90 m/min and 130 m/min (the reported limit of drying speed is 130 m/min). The gas barrier properties of Example 1 coating printed on a flexographic press were superior to the gas barrier properties of comparative Example 6 printed on a flexographic press.

Example 12. Performance of Laminates Using the Barrier Coatings

Lamination Bond Strength

The barrier coatings of the present invention were printed on various $AlO_x$/PET films, and the $AlO_x$/PET films were laminated to polyethylene films. Lamination bond strength was tested as described above. The lamination bond strength of laminates prepared using the barrier coatings of the present invention were greater than or equal to 2.0 N/15 mm.

Pasteurization and Water Immersion Resistance

Example 1 and comparative Example 6 were printed on various $AlO_x$/PET films, and the $AlO_x$/PET films were laminated to polyethylene films, heat sealed at 150° C./50 psi/1 sec dwell, and made into pouches. The pouches were pasteurized in hot water at 80° C. for 45 minutes. The pouches were assessed in the water immersion test as described above. For both tests, the edges of the pouches were assessed for signs of delamination. A "pass" means that there were no signs of delamination. The results are shown in Table 7A.

TABLE 7A

Pasteurization and water immersion performance of Examples 1 and 6

| $AlO_x$/PET film ref | Water immersion Ex. 1 | Pasteurization Ex. 6 | Ex. 6a | Ex. 1 | Ex. 6 | Ex. 6a |
|---|---|---|---|---|---|---|
| Toyobo VE100 | Pass | Fail | Fail | Pass | Fail | Fail |
| Toray Barrialox 1011 HG | Pass | Fail | Fail | Pass | Fail | Fail |
| Trias AlOx | Pass | Fail | Fail | Pass | Fail | Fail |
| Trias Metz PET 12 | Pass | Fail | Fail | Pass | Fail | Fail |

The results in Table 7A show that the barrier coating of the invention Example 1 exhibits superior pasteurization resistance and water immersion resistance versus the commercially available comparative barrier coating Example 6 and 6a.

Examples 2 and 3, and comparative Example 6 were printed on $AlO_x$/PET films, and the $AlO_x$/PET films were laminated to polyethylene films, heat sealed at 150° C./50 psi/1 sec dwell, and made into pouches. The pouches were pasteurized in hot water at 80° C. for 45 minutes. The edges of the pouches were assessed for signs of delamination. A "pass" means that there are no signs of delamination. The results are shown in Table 7B.

TABLE 7B

Pasteurization performance and OTR of Examples 2, 3, and 6

| | OTR at 50% RH | OTR at 50% RH after 20 Gelbo Flexes | OTR at 90% RH | Pasteurization |
|---|---|---|---|---|
| Ex. 2 | 0.08 | 0.37 | 2.24 | Pass |
| Ex. 3 | 0.17 | 0.68 | 1.43 | Pass |
| Ex. 6 | 0.53 | 2.56 | 2.51 | Fail |

The results in Table 7B show that the barrier coating of the invention Examples 2 and 3 exhibit superior pasteurization resistance and water immersion resistance versus the commercially available comparative barrier coating Example 6 and 6a.

Example 13. Oxygen Barrier Performance of Examples 7 to 9

Examples 7 to 9 were applied to Toyobo VE100 film, and the OTR was measured as described above. The OTR of films coated with Examples 7 to 9 were compared to the OTR of uncoated Toyobo VE100 film. The results are shown in Table 8.

TABLE 8

OTR of Examples 7 to 9

| | Ref. Film Uncoated Toyobo VE100 | Ex. 7 | Ex. 8 | Ex. 9 |
|---|---|---|---|---|
| OTR @ 50% RH | 2.2 | 0.08 | 0.07 | 0.07 |
| OTR @ 75% RH | 2.8 | 0.26 | 0.58 | 0.48 |
| OTR @ 90% RH | 4.5 | 1.73 | 1.44 | 1.36 |

The results in Table 8 show that barrier coatings comprising an amine modified PVOH not containing crosslinker and an acetoacetate modified PVOH significantly enhance the gas barrier properties of an $AlO_x$/PET film.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A gas barrier coating composition comprising:
   a) an amine modified polyvinyl alcohol; and
   b) an acetoacetate modified polyvinyl alcohol; and
   c) one or more crosslinking agents selected from the group consisting of metal carbonates, acetyl acetonates, ketones, aldehydes, dialdehydes, polymeric aldehydes, epoxysilanes, aminosilanes, alkoxy silanes, carbonyl and/or epoxy containing polymer additives comprising monomer units of vinyl alkyl ketone, azalactone derivatives, aldehyde-PEG-NHS, and acetal-PEG-NHS, titanates, zirconates, and combinations thereof;
   provided that the amount of amine modified polyvinyl alcohol and the amount of acetoacetate modified polyvinyl alcohol are selected so that the amine functional groups of the amine modified polyvinyl are in excess of the acetoacetate functional groups of the acetoacetate modified polyvinyl alcohol.

2. The gas barrier coating composition of claim 1, wherein the amine modified polyvinyl alcohol comprises less than or equal to 40 mol % amine groups; and/or wherein the acetoacetate modified polyvinyl alcohol comprises less than or equal to 30 mol % acetoacetate functional groups.

3. The gas barrier coating composition of claim 1, wherein the amine modified polyvinyl alcohol is present in an amount of 50 wt % to 99.9 wt %, based on the total weight of polyvinyl alcohol in the gas barrier coating composition; and/or wherein the acetoacetate modified polyvinyl alcohol is present in an amount of 0.1 wt % to 50 wt %, based on the total weight of polyvinyl alcohol in the gas barrier coating composition; and/or wherein the solids content is 3 wt % to 15 wt %, based on the total weight of the gas barrier coating composition.

4. The gas barrier coating composition of claim 1, wherein the amine modified polyvinyl is provided in a solution Part (A), and the acetoacetate modified polyvinyl is provided in a solution Part (B), and the ratio of amine modified polyvinyl alcohol solution Part (A) to acetoacetate modified polyvinyl alcohol solution Part (B) is from 75:25 to 99:1.

5. The gas barrier coating composition of claim 1, further comprising one or more additives independently selected from the group consisting of adhesion promoters, crosslinking agents, surface active agents, surfactants, dispersants, de-aerators, and antifoaming agents; wherein the one or more additives are each independently present in an amount of 0.1 wt % to 5 wt %, based on the total weight of the gas barrier coating composition; and/or wherein the crosslinking agent is present in an amount of 5% to 25%, relative to the total weight of the polyvinyl alcohol content of the gas barrier coating composition.

6. The gas barrier coating composition of claim 5, wherein the one or more crosslinking agents are selected from the group consisting of ammonium zirconium carbonate; ammonium zinc carbonate; formaldehyde; acetaldehyde; glyoxal; glutaraldehyde; 3-glycidoxypropyltrimethoxysilane, 3-glycidoxypropylmethyldiethoxysilane, and 2-(3,4-epoxycyclohexyl)ethyltrimethoxysilane; 3-amino-propyltrimethoxysilane, 3-aminopropyltriethoxysilane, N-(2-aminoethyl)-3-aminopropylmethyldimethoxysilane, aminoethylaminotrimethoxysilane, and aminoethylaminopropylsiloxane; methyltrimethoxysilanes, methyltriethoxysilane, dimethoxysilane, isobutyltrimethoxysilane, phenyltriethoxysilane, n-octyltriethoxysilane, vinyltrimethoxysilane, vinyltriacetoxysilane, and combinations thereof.

7. The gas barrier coating composition of claim 1, further comprising one or more nanoparticulates; wherein the one or more nanoparticulates are present in an amount of 0.1 wt % to 30 wt %, based on the total weight of the gas barrier coating composition.

8. The gas barrier coating composition of claim 7, wherein the one or more nanoparticulates are selected from the group consisting of kaolinite, montmorillonite, atapulgite, illite, bentonite, halloysite, kaolin, mica, vermiculite, diatomaceous earth and fuller's earth, calcined aluminum silicate, hydrated aluminum silicate, magnesium aluminum silicate, sodium silicate, magnesium silicate, and combinations thereof.

9. The gas barrier coating composition of claim 1, further comprising one or more additional polymers selected from the group consisting of fully and partially hydrolyzed polyvinyl alcohol and ethylene vinyl alcohol copolymers, water based acrylics, acrylic urethanes, polyurethane dispersions, and combinations thereof; and/or further comprising one or more solvents, wherein the one or more solvents are present in an amount of 1 wt % to 50 wt %, based on the total weight of the gas barrier coating composition; and/or further comprising one or more colorants in an amount of 0.1% to 40 wt %, based on the total weight of the gas barrier coating composition.

10. The gas barrier coating composition of claim 9, wherein the one or more solvents are each independently selected from the group consisting of water, alcohols, ketones, esters, and combinations thereof.

11. A method of enhancing the gas barrier properties of a substrate, comprising:
   a) applying the gas barrier coating composition of claim 1 on the substrate; and
   b) drying the gas barrier coating composition on the substrate.

12. The method of claim 11, wherein the substrate is selected from the group consisting of polyethylene terephthalate, cast polypropylene, oriented polypropylene, polylatic acid, and biaxially oriented polyamide.

13. The substrate of claim 11, further comprising one or more metal layers or one more inorganic layers; and/or wherein the substrate is a metallized film, and comprises one or more layers of aluminum, nickel, or chromium; and/or wherein the substrate comprises one or more metal oxide layers.

14. A substrate comprising the gas barrier coating composition of claim 1.

15. The substrate of claim 14, having an oxygen transmission rate of less than 1 $cm^3/m^2/day$ at 23° C. and 50% relative humidity; and/or having an oxygen transmission rate of less than 2.75 $cm^3/m^2/day$ at 23° C. and 90% relative humidity; and/or having an oxygen transmission rate of less than 1 $cm^3/m^2/day$ at 23° C. and 50% relative humidity after Gelbo flexing.

16. An article comprising the substrate of claim 14.

17. The article of claim 16, wherein the article is a packaging article; and/or wherein the article is resistant to pasteurization.

18. A laminate film comprising:
   a) the substrate of claim 14 as a first film; and
   b) a second non-coated substrate as a second film adhered to the side of the first film on which the gas barrier coating was applied.

19. The laminate film of claim 18, wherein the lamination bond strength between the first film and the second film is greater than 1.0 N/15 mm.

20. An article comprising the laminate film of claim 18.

21. The article of claim 20, wherein the article is a packaging article; and/or wherein the article is resistant to pasteurization.

22. The gas barrier coating composition of claim 1, wherein the amine modified polyvinyl is provided in a solution Part (A), and the acetoacetate modified polyvinyl is provided in a solution Part (B), and the ratio of amine modified polyvinyl alcohol solution Part (A) to acetoacetate modified polyvinyl alcohol solution Part (B) is from 94:6 to 99:1.

* * * * *